United States Patent
Bragg et al.

(10) Patent No.: US 6,959,149 B2
(45) Date of Patent: Oct. 25, 2005

(54) POWER BALANCING IN DWDM OPTICAL NETWORKS

(75) Inventors: Nigel L Bragg, Weston Colville (GB); Bram Peeters, Harlow (GB); Alan Robinson, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 662 days.

(21) Appl. No.: 10/109,917

(22) Filed: Mar. 29, 2002

(65) Prior Publication Data

US 2004/0208535 A1 Oct. 21, 2004

(51) Int. Cl.[7] .................... H04J 14/04; H04B 10/08
(52) U.S. Cl. ...................... 398/26; 398/34; 398/38; 398/158
(58) Field of Search ...................... 398/23, 24, 26, 398/27, 38, 158, 162, 34, 83

(56) References Cited

U.S. PATENT DOCUMENTS

2003/0053163 A1 * 3/2003 Li et al. ..................... 359/110

* cited by examiner

Primary Examiner—Leslie Pascal
(74) Attorney, Agent, or Firm—Barnes & Thornburg (57) ABSTRACT

The invention provides a method of balancing the power level of an optical signal within an aggregate of optical signals in an amplified dense wavelength division multiplexing DWDM optical network, as well as power balancing apparatus therefor. The method involves measuring the power level of the optical signal received at an optical receiver through the optical link and referencing said measured receive power level to a nominal power level in the multiplex immediately preceding the receiver; measuring the power level of the optical signal at an optical transmitter and referencing said measured transmit power level to a nominal power level in the multiplex immediately following the transmitter; calculating a mean power level of the optical signal from said optical measurements, the mean power level of the optical signal being the mean of the power levels of the optical signal at the transmitter and at the receiver referenced to the nominal power levels in the associated multiplexes; and adjusting the mean power level of the optical signal independently of the power levels of other optical signals carried on the same optical link to the receiver so that a desired OSNR at the receiver is achievable.

20 Claims, 4 Drawing Sheets

POWER BALANCING IN DWDM OPTICAL NETWORKS

FIELD OF THE INVENTION

The present invention relates to balancing optical power in Dense Wavelength Division Multiplexing (DWDM) networks and, more particularly, to methods and apparatus for balancing the power level of a channel within an aggregate of channels in an amplified DWDM optical network.

BACKGROUND TO THE INVENTION

The revolution in high bandwidth applications and the explosive growth of the Internet have created capacity demands that exceed traditional time division multiplexing (TDM) technology. To meet growing demands for bandwidth, Dense Wavelength Division Multiplexing (DWDM) technology has been developed that multiplies the capacity of a single fiber, and enables carriers to adopt optically-based transmission networks that will meet the next generation of bandwidth demand at a significantly lower cost than installing new fiber.

Dense wavelength division multiplexing (DWDM) technology utilizes a composite optical signal carrying multiple information streams, each transmitted on a distinct optical wavelength. The advent of integrated DWDM networks incorporating Network Elements (NE) such as erbium doped fiber amplifiers (EDFA) and optical add/drop multiplexers, (OADM) has enabled the realization of high bandwidth optical networks.

There are several aspects that make the design of DWDM systems unique. The spectrum of DWDM channels may begin to accumulate gain tilt and ripple effects as the signals propagate along a chain of optical amplifiers. Furthermore, each optical amplifier introduces amplified spontaneous emissions (ASE), i.e. noise, into the system which cause a decrease in the signal to noise ratio (OSNR), leading to signal degradation. This is significant as it is the OSNR that is delivered into the photodetector that ultimately determines the Bit Error Rate (BER) performance of a DWDM channel.

The optical noise (ASE) added by every optical amplifier in the network chain, gives rise to a problem because of the existence of gain variations between channels. Some of the gain variations are systematic variations due, for example, to the accumulated gain ripple of optical amplifiers, whereas other variations are random; for example, loss variation of individual components of demux/mux filter structures that will be seen as a loss variation between the different paths through them.

In practice, there is always a tight operating window determined by the receive power level, at which an acceptable OSNR can be achieved, and the transmit level, at which non-linear effects make channel behavior very difficult or impossible to predict. Thus it is very desirable to achieve normalization of wavelength power level within an aggregate in the presence of gain variations.

Metropolitan applications of DWDM technology face special challenges not typically found in long haul point-to-point systems, for two reasons. Firstly, the typical deployment model uses rings to connect OADMs, and consequently individual wavelengths or band of wavelengths travel different distances around the ring between their sources and destinations. By contrast, a typical long haul deployment transmits a complete aggregate of wavelengths between a single source and a single destination point.

Schemes in the past have proposed using power control on the individual wavelengths to keep power levels at the same level. This is expensive, and operationally complex. Other schemes have proposed equalizing OSNR to ensure that each channel is identical, which is ideal for point-to-point transmission but not with Metropolitan (Metro) deployments that use OADMs. Additionally, for Metro deployments, the cost sensitive nature of the market means that the use of additional components simply for power balancing with no functional purpose cannot be justified, For example, full channel breakout for equalization at intermediate points is not a commercially viable solution.

There is a need for a low overhead method and apparatus for automatically balancing optical power levels in DWDM systems so as to minimize the OSNR impairment. This is vital for achieving acceptable system performance. Accordingly it is an object of the invention to provide power balancing apparatus and a technique for delivering each channel within an amplified DWDM system to its receiver with an adequate OSNR to achieve the required system BER.

It is a general objective of the present invention to overcome or significantly mitigate one or more of the aforementioned problems.

SUMMARY OF THE INVENTION

The invention proposes a distributed control mechanism whereby the input power to the system and the output power are monitored, and the input power is such that the average input and output powers equals the nominal power level which is the power level achieved in a perfect system with no gain or loss differences between channels.

According to a first aspect of the invention there is provided a method of balancing the power level of an optical signal within an aggregate of optical signals in an amplified dense wavelength division multiplexing DWDM optical network having an optical link extending between an optical signal transmitter and an optical signal receiver, said optical signal transmitter associated with a multiplex following it on along said optical link, said optical signal receiver associated with a multiplex preceding it along said optical link, said optical link having one or more optical fibers spans, some of the optical fiber spans having an optical amplifier and variable optical attenuator VOA, said method comprising: measuring the power level of the optical signal received at the receiver through the optical link and referencing said measured receive power level to a nominal power level in the multiplex immediately preceding the receiver; measuring the power level of the optical signal at the optical transmitter and referencing said measured transmit power level to a nominal power level in the multiplex immediately following the transmitter; calculating a mean power level of the optical signal from said optical measurements, the mean power level of the optical signal being the mean of the power levels of the optical signal at the transmitter and at the receiver referenced to the nominal power levels in the associated multiplexes; and adjusting the mean power level of the optical signal independently of the power levels of other optical signals carried on the same optical link to the receiver so that a desired OSNR at the receiver is achievable.

According to a second aspect of the invention there is provided power balancing apparatus for balancing the power level of an optical signal within an aggregate of optical signals in an amplified dense wavelength division multiplexing DWDM optical network having an optical link extending between an optical signal transmitter and an optical signal receiver, said optical signal transmitter associated with a multiplex following it on along said optical link, said optical signal receiver associated with a multiplex preceding it along said optical link, said optical link having one or more optical fibers spans, some of the optical fiber spans having an optical amplifier and variable optical attenuator VOA, said apparatus comprising: a first-order closed mean power control loop extending between the receiver and the transmitter, said control loop operable to calculate a mean power level of the optical signal and to adjust the mean power level of said optical signal so that a desired OSNR for said optical signal at the receiver is achieved, the mean power level being the mean of the power levels of said optical signal at the transmitter and at the receiver referenced to the nominal power levels in the associated multiplexes.

According to a third aspect of the invention there is provided an optical communications system comprising: a dense wavelength division multiplexing DWDM optical network having an optical link extending between an optical signal transmitter and an optical signal receiver, said optical signal transmitter associated with a multiplex following it on along said optical link, said optical signal receiver associated with a multiplex preceding it along said optical link, said optical link having one or more optical fibers spans, some of the optical fiber spans having an optical amplifier and variable optical attenuator VOA; and a first-order closed mean power control loop extending between the receiver and the transmitter, said control loop operable to calculate a mean power level of the optical signal and to adjust the mean power level of said optical signal so that a desired OSNR for said optical signal at the receiver is achieved, the mean power level being the mean of the power levels of said optical signal at the transmitter and at the receiver referenced to the nominal power levels in the associated multiplexes.

According to a fourth aspect of the invention there is provided a computer readable storage medium storing instructions that, when executed by a computer, cause the computer to perform a method of balancing the power level of an optical signal within an aggregate of optical signals in an amplified dense wavelength division multiplexing DWDM optical network according to the first aspect.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described by way of example only, with reference to the drawings in which.

DETAILED DESCRIPTION OF THE PREFERRED EMBODIMENTS

The invention utilizes the observation that equalizing mean power along an amplifier chain results in a very small OSNR penalty compared to the nominal (flat gain) case where the gain ripple is constant for each wavelength (i.e. the power in each wavelength increases or decreases uniformly along the chain of amplifiers). Furthermore, even when the gain ripple is not constant and has a significant random component, equalization of mean power still provides significant benefits over simple equalization of transmit power. For instance, with completely random ripple along each channel, the headroom required to accommodate the worst-case peak power is approximately halved, and the worst-case OSNR reduction from nominal is also halved.

By using a distributed control system, it is possible to control each wavelength independently, with no requirement for synchronization or communication between the control loops. The elimination of a centralized synchronizing/managing module is particularly advantageous for the Metropolitan deployment model of distributed termination points. The distributed control system relies on a control metric (such as mean power) for which it can be guaranteed that it can be driven to its target value on all wavelengths, so that there is no need to make tradeoffs between wavelengths. The system employs a simple first order loop in log space on each channel, and careful time-constant selection to ensure that the coupling between channels due to gain tilt in each optical amplifier will not cause instability.

Control of the interaction between the end-to-end wavelength power control loops and the local aggregate power control loops also needs to be managed. Otherwise the interaction between the two control loops, especially when there are a small of channels running for different distances through the system, can lead to gain tilt resulting in significant deviation in measured power per channel.

System Assumptions

Before giving a detailed description of an automatic power balancing scheme according to a preferred embodiment, there are a number of important assumptions made by the power balancing system which need to be stated, and are as follows.

To start with, it is a fundamental attribute of the system design that nominal power levels are normalised across the system. This occurs across two dimensions: firstly, in the absence of impairments (i.e. gain ripple), all wavelengths present in a multiplex at any point have the same nominal power; secondly, by default, the per wavelength power level at equivalent points (notably the amplifier outputs) is the same in all Network Elements (NEs) (local exceptions can be made to this rule to eliminate unnecessary amplifiers, but only if the next amplifier downstream can restore the proper normalised power level). The important consequence of this for the power balancing scheme is that the desired set-point for any particular wavelength is known in advance and is independent of the behaviour of all other wavelengths.

In addition, the power balancing scheme relies on reliable messaging between all pairs of multiplex end-points during the period in which wavelengths are being introduced into or withdrawn from service (communication between the directly affected end-points is not enough, as there is a modest level of coupling between all wavelengths in a multiplex).

Also, the power balancing scheme assumes that the source power level can be controlled and that the source and receive power levels can be measured, all at the level of the individual wavelength, and that these measurements can be referred to the per wavelength power level in the line DWDM multiplex at originating and terminating NEs. There is, however, no requirement for per wavelength power measurement at any intermediate NEs.

Finally, the power balancing scheme assumes that the number of wavelengths passing any point is known to the Operation, Administration and Maintenance module (OAM) and that this information can be made available.

Figure 1:
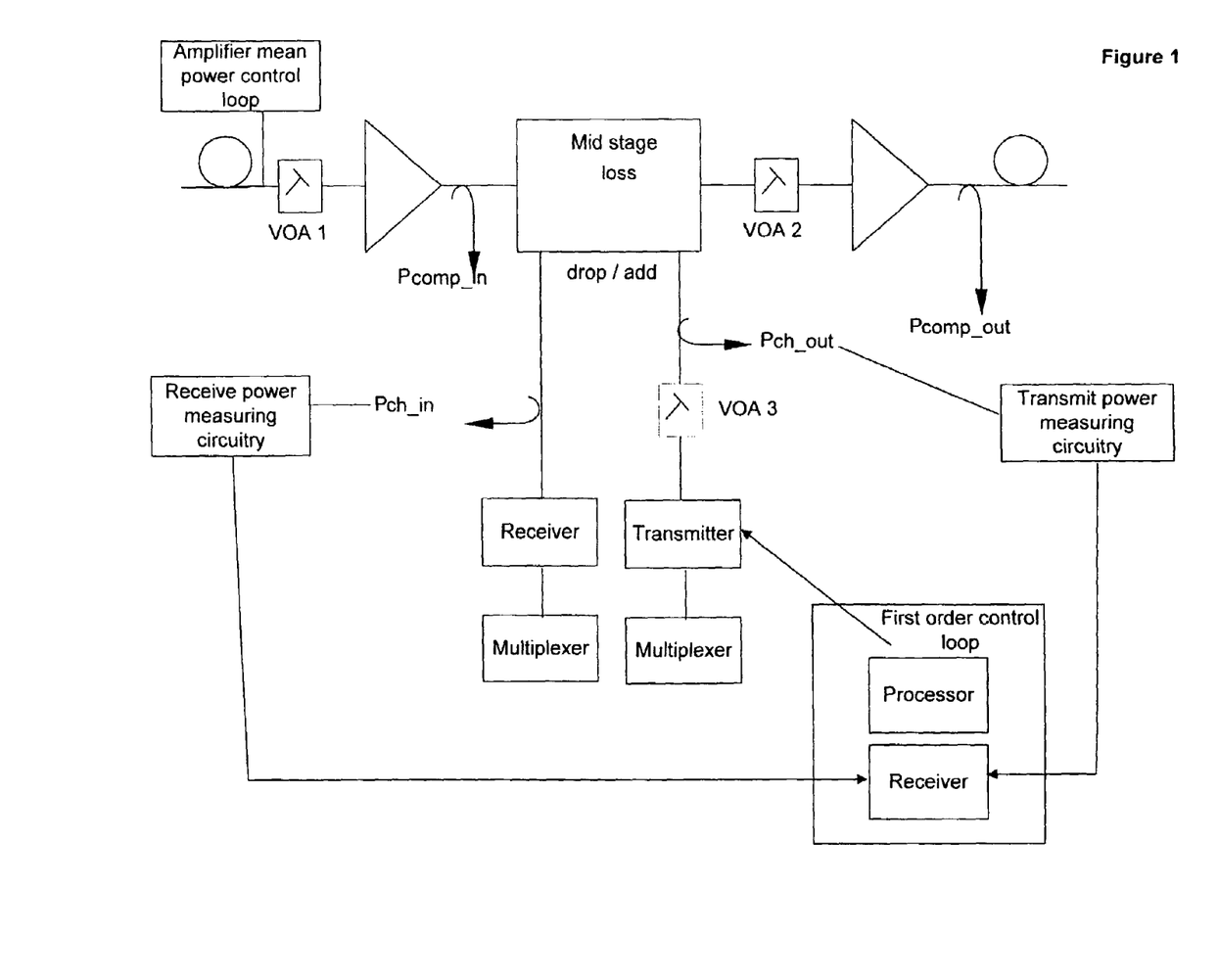
FIG. 1 is a schematic diagram of a section of an optical communications network in accordance with an embodiment of the present invention.

In the power balancing scheme in accordance with a preferred embodiment, there are actually three control loop types, two of which are shown in FIG. 1 which depicts a section of an optical communications network. The control loops are: amplifier gain control loops (not shown), an end-to-end channel level control loop, and a mean power control loop.

Each amplifier has an amplifier gain control loop that uses (typically) aggregate power at input and output to stabilise amplifier gain to a design value; this loop has a time constant of the order of milliseconds. The amplifier gain control loops can be treated as internal to the amplifiers, and are not discussed further here.

The end-to-end channel level control loop monitors the power per channel at input Pch__in and the matching power per channel at output Pch__out and at the VOA 3. This control loop is described in more detail further below.

The mean power control loop monitors the average power per channel at each amplifier output, and uses a Variable Optical Attenuator (VOA) at the amplifier input to set the power to the design value, and thereby compensate for different span or mid-stage losses. From FIG. 1 it can be seen that Pcomp__in and VOA 1, and Pcomp__out and VOA 2, perform the mean power control function for their respective amplifiers. The interaction of this loop with the channel level control loop is discussed later.

End-to-End Channel Level Control

One approach to minimising the penalty imposed by gain variation between wavelengths is to place the important parameter, in this case OSNR, under closed loop control, and to define loop behaviour which equalises this parameter for all wavelengths in the aggregate. But, this approach is inappropriate for cost-sensitive systems because, the provision of an Optical Spectrum Analyser (OSA) per NE to determine OSNR is a significant cost penalty, and OSNR equalisation is a global optimisation problem, which does not map well onto a distributed system implementation.

However, it has been observed that when the gain ripple of a specific wavelength is highly correlated between amplifiers (so that each wavelength has a systematic "tilt" along a amplifier chain), the OSNR impairment (compared to the ideal flat gain case) is minimal if the mean power of each wavelength is set to the nominal value. Furthermore, extensive simulation has shown that this benefit is still obtained if a substantial part of the gain ripple is random, as a result of filter loss variations, for example. A further benefit of mean power control is that it approximately halves the maximum power seen at any point compared to what is seen in its absence.

Accordingly, the objective of the power balancing algorithm is to achieve the following for each wavelength:

(multiplex-referred source power+multiplex-referred RX power)/2=0 dB

This choice of metric is also important for achieving distributed operation with each wavelength controlled independently, and no requirement for synchronisation or communication between the control loops. To do this requires a metric that is guaranteed to be driveable to its target value on all wavelengths simultaneously, so there is no need to make tradeoffs between wavelengths.

To achieve this behaviour requires a simple first order feedback loop in log space on each channel, because although there is coupling between the different control loops sharing amplifiers for all or part of their wavelength path, this coupling is modest as will become apparent later.

Assume for now that the amplifier mean power per channel has been set on start-up. The basic control law is a simple first-order loop controlling channel level in log units (i.e. dB):

$$Pch\_out_{n+1}=Pch\_out_n+K.(set_n-(pch\_out_n+Pch\_in_n)/2) 0<K<1$$

where $set_n=(Pch\_out_{nominal}+Pch\_in_{nominal})/2$, and $Pch\_out_0$ is set to a suitably small value (say −30 dBm).

The filter time constant is ~T/K, where T is the iteration period.

This basic loop is unconditionally stable. Coupling does occur between the channel control loops under the "constant aggregate power gain" control law within an amplifier when gain ripple is present, but extensive simulation has shown that no instability arises. This is due to the modest level of this coupling; the effect of gain tilt in a single channel with gain tilt dG[i] on the average amplifier gain G for a single channel power change of x[i] within an aggregate of N wavelengths can be shown to be approximately:

$$\delta G/\delta x[i]=-0.23.dG[i]/N \text{ (all variables in dB)}$$

Thus it can be seen that the change in average gain of the amplifier is only −0.1 dB per dB gain tilt per dB of channel power change even when only two wavelengths are present, and decreases with the number of wavelengths.

This coupling will still cause perturbation in the powers of established wavelengths when a wavelength is introduced too rapidly, such that the change is outside the bandwidth of the control loop. Controlling the set point slew rate during start up of a new channel can essentially eliminate this transient ripple.

Control of Aggregate Power in Amplifiers

In a system without end-to-end channel level power control, the mean power per channel in each amplifier is controlled independently, using a local control loop in conjunction with a VOA, to set the power into a constant gain amplifier to its nominal level when the fibre loss of the preceding span is less than the design maximum value. This is known as "span loss padding".

However, when end-to-end channel level power control is applied, there is interaction between the end-to-end wavelength power control loops and the local amplifier mean power control loops. The problem manifests itself with small numbers of channels running for different distances through the system, as happens in Metro deployments, so that gain tilt can result in significant deviation in measured power per channel.

Figure 2:
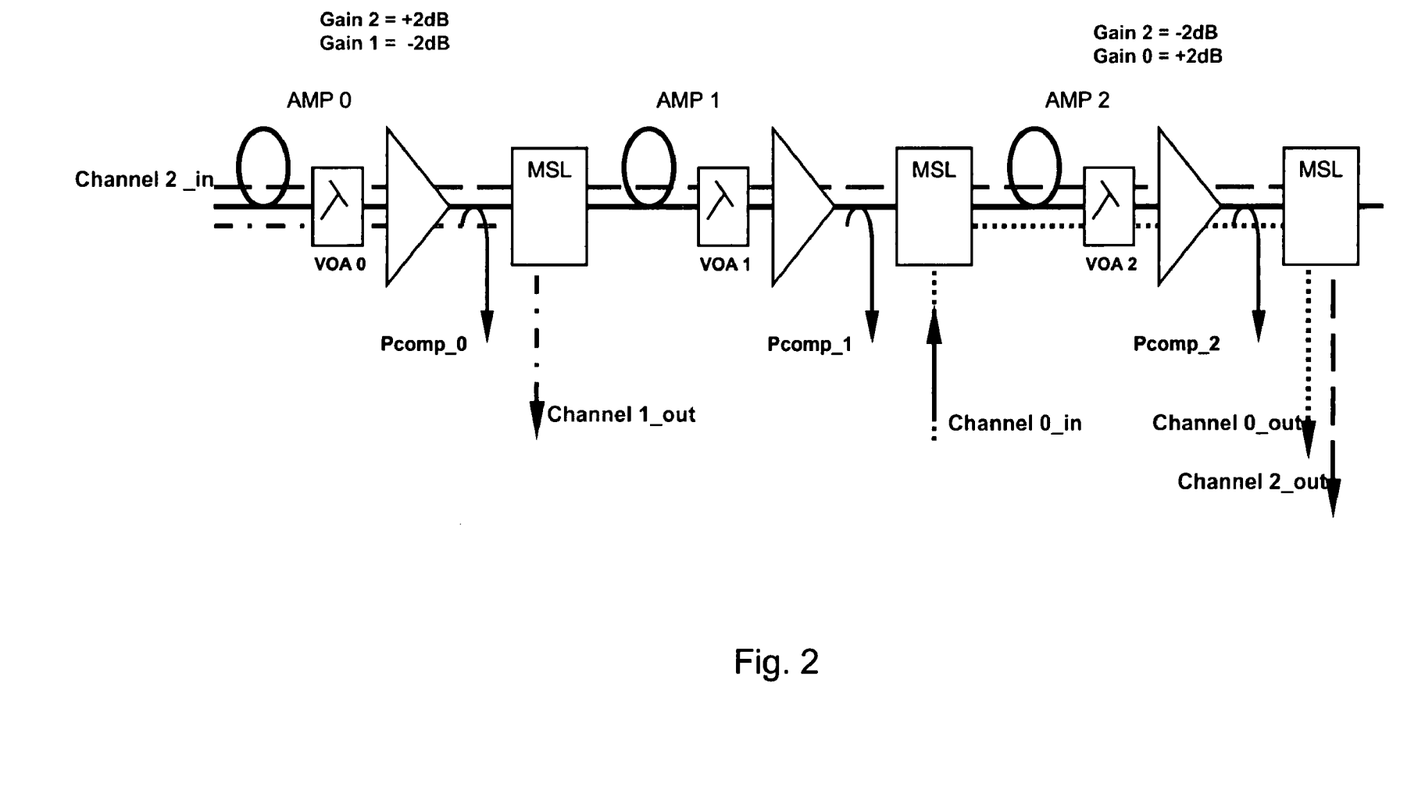
FIG. 2 is a schematic diagram of a section of an optical communications network used to illustrate the effects of interaction between the end-to-end wavelength power control loops and the local amplifier mean power control loops.
Figure 3:
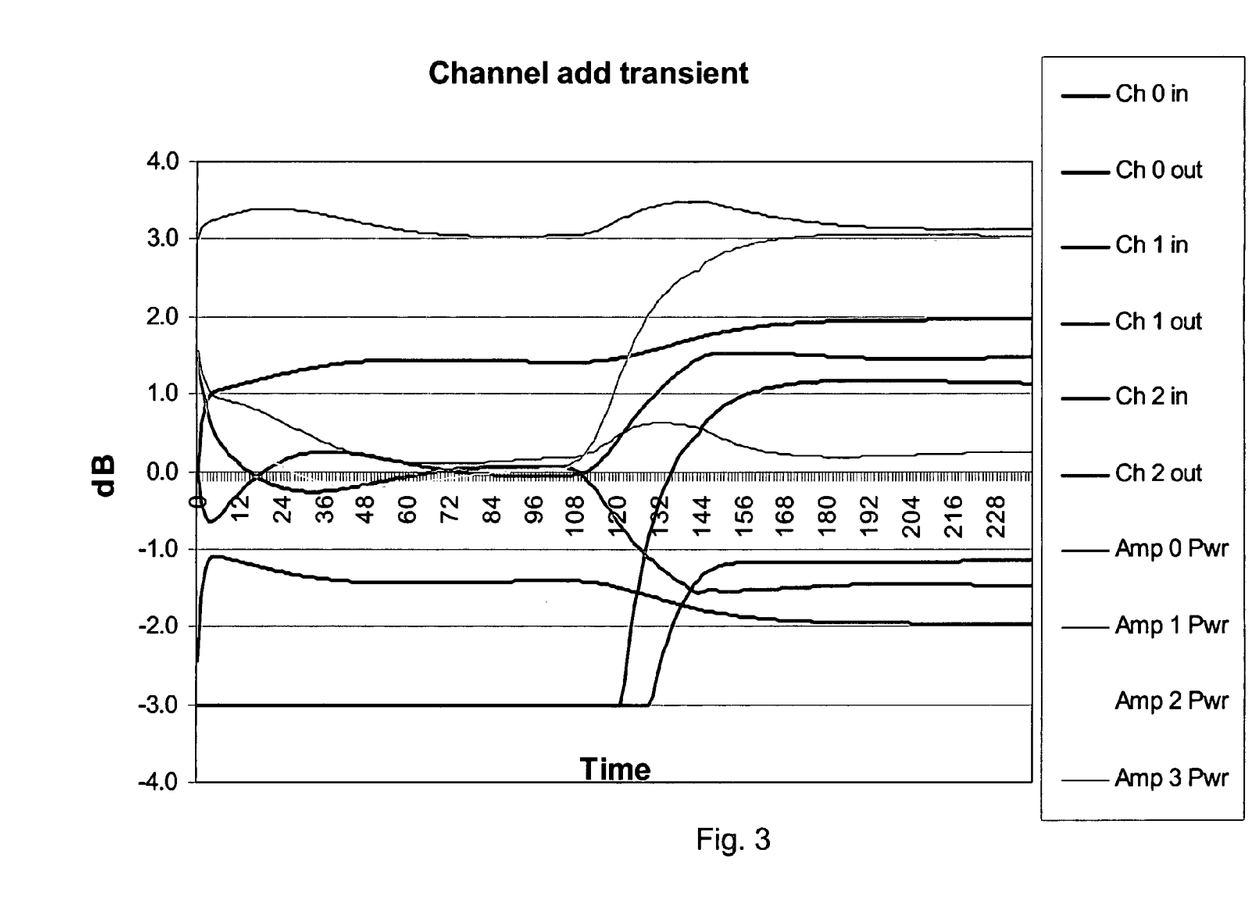
FIG. 3 is a plot of Power against Time for the amplifiers and the channels depicted in FIG. 2 to illustrate the effects of interaction between the end-to-end wavelength power control loops and the local amplifier mean power control loops.

To illustrate the interaction, consider this scenario as illustrated in FIG. 2 (with extreme tilt values) and the effects of the interaction illustrated in the graph of FIG. 3. Suppose first that channel 0 has not been powered up; channel 2 is the sole user of amplifiers AMP1 and AMP2, so no "tilt" is possible, and a perfect (infinite gain) power control loop on VOA 1 will set Pcomp__1 to 0 dB (i.e. nominal). Hence channel 2__out will be set to 0 dB also, and so the Channel level Control on channel 2 will servo channel 2__in to 0 dB. As a result, channel 1 sees more than its share of the gain tilt in amplifier 0, because channel 2 is going into amplifier 0 at 0 dB and is "power-hogging".

Things get worse when channel 0 is powered up; channel 0 now hogs output power in amplifier 2 (because of the positive gain tilt), so the output of channel 2 falls below 0 dB, its level defined only by the gain tilt in a following third amplifier (in the network chain that continues to the right of the circuit drawn in FIG. 2, but which is not shown) and not by its input, because VOA 1 holds the input of amplifier 1 to 0 dB. Channel control now causes the channel 2 input to rise further to compensate, which further exacerbates the power-hogging in amplifier 0 by channel 2, and further increases the gain tilt in amplifier 0 seen by channel 1. FIG. 3 illustrates these effects.

These are two possible ways to address this problem. The first is to set the amplifier mean power VOA using measurements made independently of the average channel power level in the amplifier. The alternative is to use a more sophisticated mean power control loop, with finite and well-controlled gain.

Figure 4:
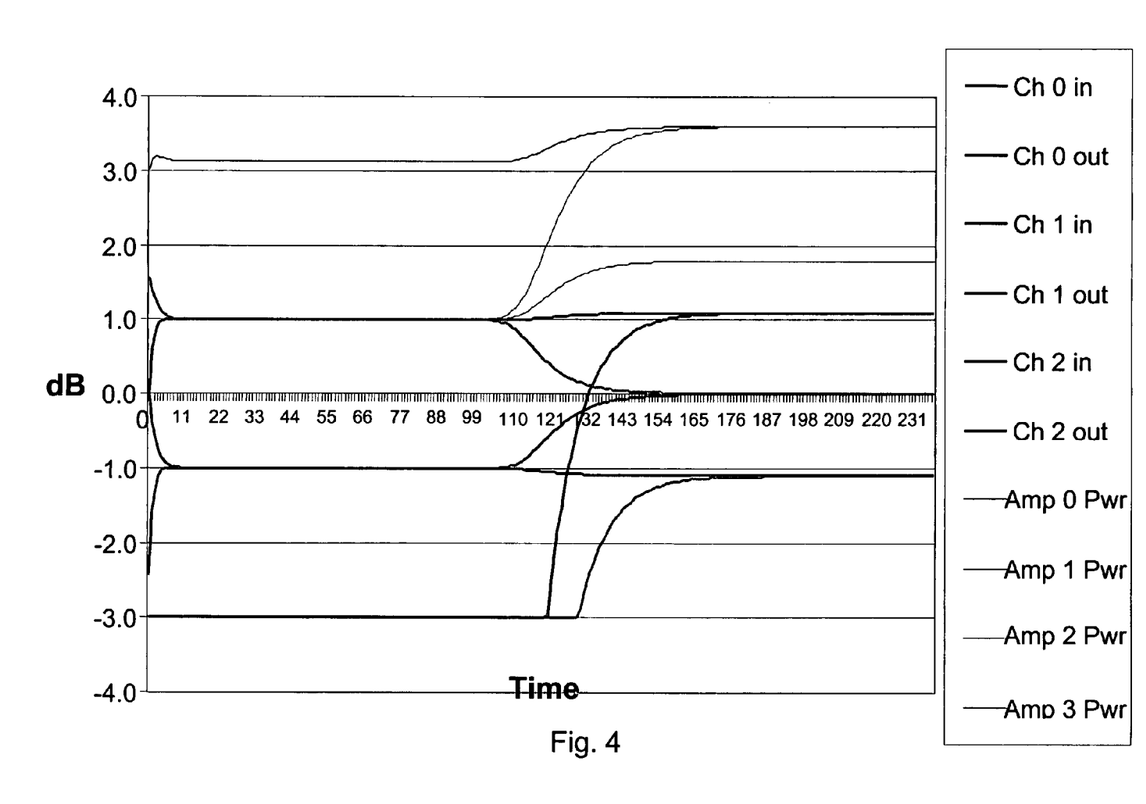
FIG. 4 is a plot of Power against Time for the amplifiers and the channels depicted in FIG. 2 when the amplifier mean power control loop is essentially disabled.

The first solution essentially disables the amplifier mean power control loop. The mean power control VOA would be set on start-up to compensate to the nominal span loss, as determined by independent means, whereupon there is no interaction possible between the control loops. However, control of the total amplifier power is now lost, as shown by the traces of the graph of FIG. 4. This does not matter at low wavelength counts as the amplifier is not operating anywhere near saturation. At high wavelength counts, when amplifier saturation is a danger, the fact that the standard deviation of total power, expressed in dB, decreases as the number of channels increases can be exploited:

$$\sigma(P_{tot}(N))=\sigma(P_{tot}(1))/\sqrt{(N)}$$

The alternative solution is to use a variable gain mean power control, with loop gain controlled as a function of channel count.

The amplifier mean power control VOA is set on start-up to compensate for the nominal span loss (as above), but is thereafter controlled with very low gain at low channel counts. Thus the VOA settings hardly move from their initial set-points and channel-channel interaction is determined only by gain tilt and the channel level control loops, which is acceptable at low channel counts because there is ample total amplifier power.

The VOA is controlled with higher gain at high channel counts to ensure adequate control of total power when near amplifier saturation, when the interaction between individual channel pairs is much lower. This approach ensures that any initial set-point error in the mean power control VOA is not "frozen in".

The variable gain mean power control loop will now be defined more rigorously. The VOA loss L should be set by a simple first order recursive loop (after $L_o$ has first been set by independent means):

$$L_{n+1}=L_n.(1-K(N))+(Pcomp_n-Pset\ (N)).Gain(N).K(N)$$

where:

$Pcomp_n$ is the current total output power (as defined earlier)

$Pset(N)=10.\log_{10}(N)$ is the nominal total output power for N channels.

Gain(N) is chosen heuristically and advantageously may have the following characterstics:

gain=0.05 for N=1 channel (i.e. the VOA control is almost disabled), gain-1 for N=one quarter of the maximum number of channels for which the system is designed; the VOA removes half of any error in input power.

Gain=10 for N=the maximum number of channels for which the system is designed; the VOA removes 90% of any error in input Power.

The time Constant −T/Gain(N).K(N) where T is the sampling period, and is set so that:

1/Gain(N).K(N)>10/$K_{channel}$ (to ensure that the channel level loops remain closed), and Gain(N).K(N)<¼. Number of Amplifiers in whole system This latter point is important because of the instant feed-forward of a power change through all VOAs, before any mean power control loop can react, whereupon they all react simultaneously. The initial response of the full chain of mean power control loops to a change $D_{in}$, caused by the operation of a channel-level control loop, is therefore:

$$D_{out}=D_{total\_loss}=-D_{in}.\text{Number of Amplifiers}.\text{Gain}(N).K(N)$$

which if greater in magnitude than the original transient (i.e. change) will increase the error signal seen by the channel-level control loop, and oscillation results. The factor ¼ above allows for asynchronous loops and a further ½ safety factor.

The final element of the procedure defines the VOA loop behaviour during power-up or power-down of a channel passing through it:

during the transient, Pset(N), Gain(N) and K(N) are undefined, so the VOA control loop must be "frozen" ($L_{n+1}=L_n$) for the transient duration.

Although the embodiments of the invention described with reference to the drawings comprise computer apparatus and processes performed in computer apparatus, the invention also extends to computer programs/software, particularly computer programs/software on or in a carrier, adapted for putting the invention into practice. The program/software may be in the form of source code, object code, a code intermediate source and object code such as in partially compiled form, or in any other form suitable for use in the implementation of the processes according to the invention. The carrier be any entity or device capable of carrying the program.

For example, the carrier may comprise a storage medium, such as ROM, or example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although the invention has been shown and described with respect to a best mode embodiment thereof, it should be understood by those skilled in the art that the forgoing and various other changes, omissions and additions in the form and detail thereof may be made therein without departing from the scope of the invention as claimed.

We claim:

1. A method of balancing the power level of an optical signal within an aggregate of optical signals in an amplified dense wavelength division multiplexing DWDM optical network having an optical link extending between an optical signal transmitter and an optical signal receiver, said optical signal transmitter associated with a multiplexer following it on along said optical link, said optical signal receiver associated with a multiplexer preceding it along said optical link, said optical link having one or more optical fibers spans, some of the optical fiber spans having an optical amplifier and variable optical attenuator VOA, said method comprising:
    measuring the power level of the optical signal received at the receiver through the optical link and referencing said measured receive power level to a nominal power level in the multiplexer immediately preceding the receiver;
    measuring the power level of the optical signal at the optical transmitter and referencing said measured transmit power level to a nominal power level in the multiplexer immediately following the transmitter;
    calculating a mean power level of the optical signal from said optical measurements, the mean power level of the optical signal being the mean of the power levels of the optical signal at the transmitter and at the receiver referenced to the nominal power levels in the associated multiplexers; and
    adjusting the mean power level of the optical signal independently of the power levels of other optical signals carried on the same optical link to the receiver so that a desired OSNR at the receiver is achievable.

2. A method according to claim 1, wherein the mean power level of the optical signal is a logarithmic mean power level.

3. A method according to claim 1, wherein adjusting the mean power level of the optical signal is conducted using a first-order closed control loop in log space so as to maintain network stability.

4. A method according to claim 1, wherein adjusting the mean power level comprises:
    calculating an amount of transmitter optical power adjustment of the optical transmitter from said optical power level measurements; and
    adjusting the power level of the optical signal at the transmitter by an amount that sets the mean power level of the optical signal to substantially the nominal value.

5. A method according to claim 1, further comprising in respect of each optical fiber span having an optical amplifier and variable optical attenuator VOA:
    configuring the VOA for setting the mean power into each amplifier on start-up to a nominal value when the fiber loss of the preceding optical fiber span is less than a design maximum value; thereafter
    at a low number of optical signals in the multiplexer, controlling the VOA with low gain; and
    at a high number of optical signals in the multiplexer, controlling the VOA with high gain.

6. A method according to claim 2, wherein adjusting the mean power level of the optical signal is conducted using a first-order closed control loop in log space so as to maintain network stability.

7. A method according to claim 2, wherein adjusting the mean power level comprises:
    calculating an amount of transmitter optical power adjustment of the optical transmitter from said optical power level measurements; and
    adjusting the power level of the optical signal at the transmitter by an amount that sets the mean power level of the optical signal to substantially the nominal value.

8. A method according to claim 2, further comprising in respect of each optical fiber span having an optical amplifier and variable optical attenuator VOA:
    configuring the VOA for setting the mean power into each amplifier on start-up to a nominal value when the fiber loss of the preceding optical fiber span is less than a design maximum value; thereafter
    at a low number of optical signals in the multiplexer, controlling the VOA with low gain; and
    at a high number of optical signals in the multiplexer, controlling the VOA with high gain.

9. A method according to claim 3, wherein adjusting the mean power level comprises:
    calculating an amount of transmitter optical power adjustment of the optical transmitter from said optical power level measurements; and
    adjusting the power level of the optical signal at the transmitter by an amount that sets the mean power level of the optical signal to substantially the nominal value.

10. A method according to claim 3, further comprising in respect of each optical fiber span having an optical amplifier and variable optical attenuator VOA:
    configuring the VOA for setting the mean power into each amplifier on start-up to a nominal value when the fiber loss of the preceding optical fiber span is less than a design maximum value; thereafter
    at a low number of optical signals in the multiplexer, controlling the VOA with low gain; and
    at a high number of optical signals in the multiplexer, controlling the VOA with high gain.

11. A method according to claim 4, further comprising in respect of each optical fiber span having an optical amplifier and variable optical attenuator VOA:
    configuring the VOA for setting the mean power into each amplifier on start-up to a nominal value when the fiber loss of the preceding optical fiber span is less than a design maximum value; thereafter
    at a low number of optical signals in the multiplexer, controlling the VOA with low gain; and
    at a high number of optical signals in the multiplexer, controlling the VOA with high gain.

12. A method according to claim 6, further comprising in respect of each optical fiber span having an optical amplifier and variable optical attenuator VOA:
    configuring the VOA for setting the mean power into each amplifier on start-up to a nominal value when the fiber loss of the preceding optical fiber span is less than a design maximum value; thereafter at a low number of optical signals in the multiplexer, controlling the VOA with low gain; and at a high number of optical signals in the multiplexer, controlling the VOA with high gain.

13. Power balancing apparatus for balancing the power level of an optical signal within an aggregate of optical signals in an amplified dense wavelength division multiplexing DWDM optical network having an optical link extending between an optical signal transmitter and an optical signal receiver, said optical signal transmitter associated with a multiplexer following it on along said optical link, said optical signal receiver associated with a multiplexer preceding it along said optical link, said optical link having one or more optical fibers spans, some of the optical fiber spans having an optical amplifier and variable optical attenuator VOA, said apparatus comprising:

a first-order closed mean power control loop extending between the receiver and the transmitter, said control loop operable to calculate a mean power level of the optical signal and to adjust the mean power level of said optical signal so that a desired OSNR for said optical signal at the receiver is achieved, the mean power level being the mean of the power levels of said optical signal at the transmitter and at the receiver referenced to the nominal power levels in the associated multiplexers.

14. Power balancing apparatus according to claim 13, further comprising:

receive power measuring circuitry operable to measure the power level of the optical signal being received by the optical receiver through the optical link and to reference said measured receive power level to a nominal power level in the multiplexer immediately preceding the receiver;

transmit power measuring circuitry operable to measure the power level of the optical signal being transmitted by the optical transmitter and to reference said measured transmit power level to a nominal power level in the multiplexer immediately following the transmitter; and said first-order closed mean power control loop comprises:

a receiver for receiving the optical power level measurements of the optical signal;

a processor operable to calculate the mean power level of the optical signal, and an amount of transmitter optical power adjustment of the optical transmitter from said optical power level measurements; and a communication line operable to communicate the amount of transmitter optical power adjustment of the optical transmitter.

15. Power balancing apparatus according to claim 13, further comprising in respect of each optical fiber span having an optical amplifier and variable optical attenuator VOA:

an amplifier mean power control loop extending between downstream of the amplifier and upstream of the VOA, said amplifier mean power control loop operable to determine the span loss of the preceding optical fiber span and to control the VOA to adjust the power level of the aggregate of optical signals being input to the amplifier, said adjustment being dependent on the number of optical signals comprising the aggregate and on the amplifier gain.

16. An optical communications system comprising:

a dense wavelength division multiplexing DWDM optical network having an optical link extending between an optical signal transmitter and an optical signal receiver, said optical signal transmitter associated with a multiplex following it on along said optical link, said optical signal receiver associated with a multiplexer preceding it along said optical link, said optical link having one or more optical fibers spans, some of the optical fiber spans having an optical amplifier and variable optical attenuator VOA; and a first-order closed mean power control loop extending between the receiver and the transmitter, said control loop operable to calculate a mean power level of the optical signal and to adjust the mean power level of said optical signal so that a desired OSNR for said optical signal at the receiver is achieved, the mean power level being the mean of the power levels of said optical signal at the transmitter and at the receiver referenced to the nominal power levels in the associated multiplexers.

17. An optical communications system according to claim 16, further comprising:

receive power measuring circuitry operable to measure the power level of the optical signal being received by the optical receiver through the optical link and to reference said measured receive power level to a nominal power level in the multiplexer immediately preceding the receiver;

transmit power measuring circuitry operable to measure the power level of the optical signal being transmitted by the optical transmitter and to reference said measured transmit power level to a nominal power level in the multiplexer immediately following the transmitter; and said first-order closed mean power control loop comprises:

a receiver for receiving the optical power level measurements of the optical signal;

a processor operable to calculate the mean power level of the optical signal, and an amount of transmitter optical power adjustment of the optical transmitter from said optical power level measurements; and a communication line operable to communicate the amount of transmitter optical power adjustment of the optical transmitter.

18. An optical communications system according to claim 16, further comprising an amplifier mean power control loop extending between downstream of the amplifier and upstream of the VOA, said amplifier mean power control loop operable to determine the span loss of the preceding optical fiber span and to control the VOA to adjust the power level of the aggregate of optical signals being input to the amplifier, said adjustment being dependent on the number of optical signals comprising the aggregate and on the amplifier gain.

19. A computer readable storage medium storing instructions that, when executed by a computer, cause the computer to perform a method of balancing the power level of an optical signal within an aggregate of optical signals in an amplified dense wavelength division multiplexing DWDM optical network having an optical link extending between an optical signal transmitter and an optical signal receiver, said optical signal transmitter associated with a multiplexer following it on along said optical link, said optical signal receiver associated with a multiplexer preceding it along said optical link, said optical link having one or more optical fibers spans, some of the optical fiber spans having an optical amplifier and variable optical attenuator VOA, said method comprising:

measuring the power level of the optical signal received at the receiver through the optical link and referencing said measured receive power level to a nominal power level in the multiplexer immediately preceding the receiver;

measuring the power level of the optical signal at the optical transmitter and referencing said measured transmit power level to a nominal power level in the multiplexer immediately following the transmitter;

calculating a mean power level of the optical signal from said optical measurements, the mean power level of the optical signal being the mean of the power levels of the optical signal at the transmitter and at the receiver referenced to the nominal power levels in the associated multiplexers; and     adjusting the mean power level of the optical signal independently of the power levels of other optical signals carried on the same optical link to the receiver so that a desired OSNR at the receiver is achievable.

20. A computer readable storage medium according to claim 19, further comprising in respect of each optical fiber span having an optical amplifier and variable optical attenuator VOA:

configuring the VOA for setting the mean power into each amplifier on start-up to a nominal value when the fiber loss of the preceding optical fiber span is less than a design maximum value; thereafter     at a low number of optical signals in the multiplexer, controlling the VOA with low gain; and     at a high number of optical signals in the multiplexer, controlling the VOA with high gain.

* * * * *